United States Patent [19]

Chughtai et al.

[11] Patent Number: 4,782,772
[45] Date of Patent: Nov. 8, 1988

[54] METHOD OF DIRECTLY REMOVING SULFUR, WITH FLUE DUST BEING RETURNED

[75] Inventors: Yaqub Chughtai, Gummersbach; Volkmar Sitte, Wiehl, both of Fed. Rep. of Germany

[73] Assignee: L. & C. Steinmüller GmbH, Gummersbach, Fed. Rep. of Germany

[21] Appl. No.: 108,723

[22] Filed: Oct. 14, 1987

[30] Foreign Application Priority Data

Oct. 15, 1986 [DE] Fed. Rep. of Germany ....... 3635027

[51] Int. Cl.⁴ .............................................. F23J 11/00
[52] U.S. Cl. ................................. 110/345; 110/204; 110/215; 110/216; 423/244
[58] Field of Search ............... 110/203, 204, 215, 216, 110/233, 234, 342, 343, 344, 345, 165 R; 423/242 A, 242 R, 244 A, 244 R; 55/73

[56] References Cited

U.S. PATENT DOCUMENTS

| | | | |
|---|---|---|---|
| 4,309,393 | 1/1982 | Nguyen | 423/244 A |
| 4,387,078 | 6/1983 | Lin | 423/244 A |
| 4,397,742 | 8/1983 | Minnick | 55/73 X |
| 4,519,995 | 5/1985 | Schrofelbauer et al. | 110/343 X |
| 4,550,049 | 5/1986 | Staudinger | 110/343 X |
| 4,645,654 | 2/1987 | Barczak | 110/343 X |

FOREIGN PATENT DOCUMENTS 3428502 3/1985 Fed. Rep. of Germany .

Primary Examiner—Steven E. Warner
Attorney, Agent, or Firm—Becker & Becker

[57] ABSTRACT

A method of purifying flue gas from the firing equipment of a combustion unit, especially fuel gas from fitting equipment to which low-ash flue is supplied, or from a grating firing having a high degree of ash removal, with the flue gas containing noxious compounds. A finely divided or pulverous basic additive is used on which the noxious compounds produced during firing are adsorbed. Flue dust, especially flue dust/additive mixture, that is carried along in the flue gas is separated from the latter, with at least a portion of the separated-off flue dust being hydrated and sifted, whereby subsequently at least a portion of the dry, hydrated flue dust is returned to the flue gas purification process. Non-pulverized flue dust is homogenously mixed with finely sprayed water to effect the hydration. The return of flue dust to the flue gas purification process is undertaken by returning at least a portion of dry, thus-hydrated flue dust to the firing equipment of the combustion unit.

14 Claims, 1 Drawing Sheet

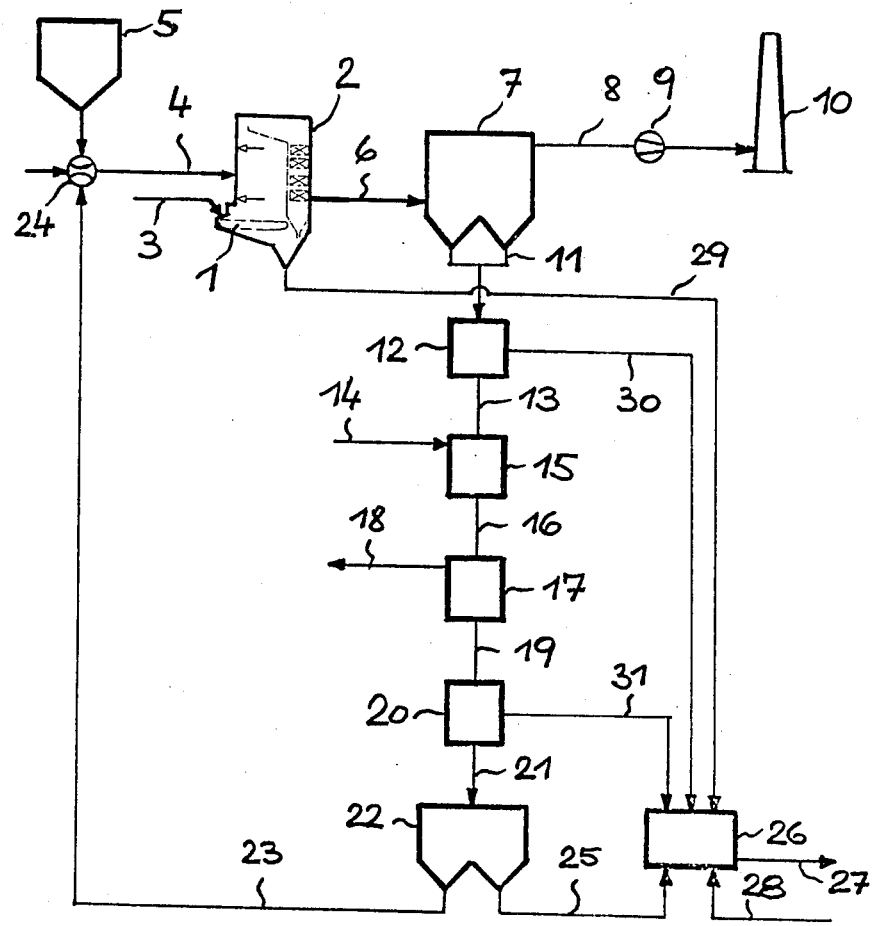

METHOD OF DIRECTLY REMOVING SULFUR, WITH FLUE DUST BEING RETURNED

BACKGROUND OF THE INVENTION

The present invention relates to a method of purifying flue gas from the firing equipment of a combustion unit, especially flue gas from firing equipment to which low-ash fuel is supplied, or from a grating firing having a high degree of ash removal, with the flue gas containing noxious compounds. A finely divided or pulverous basic additive is used on which the noxious compounds produced during firing are adsorbed. Flue dust, especially flue dust/additive mixture, that is carried along in the flue gas is separated from the flue gas, with at least a portion of the separated-off flue dust being hydrated and sifted, whereby subsequently at least a portion of the dry, hydrated flue dust is returned to the flue gas purification process.

Methods where the noxious gases are bound by a basic additive in the region of the firing equipment of a combustion unit, such as a steam generator, are classified as primary flue gas purification methods. In addition to sulfur compounds, halogen compounds such as HCl and HF can be present in the flue gas as noxious gases. In the context of the present application, the term flue dust refers to the additive originating from the flue gas purification, with or without flue ash derived from the fuel. Examples of additive include hydroxide or carbonate compounds of the metals calcium or magnesium, as well as mixtures thereof, with limestone being preferred. The main problem of the heretofore known methods is that the additive can be used only partially. One criterium that is to be observed in this connection is the reaction temperature at which the noxious gases can be bound. Depending upon the time and temperature characteristics of the additive that is used, this reaction temperature should, if possible, be no greater than 1250° C. in order to prevent not only sintering of the surface-active additive, but also encapsulation of the additive by flue ash resulting from the firing. Another criterium is the effective retention time of the additive in the flue gas stream from which the noxious compounds are to be removed. This retention time is particularly greatly affected by the mixing and distribution of the additive in the flue gas, as well as by the length of time the additive remains in the combustion unit. All improvements to the method therefore contain measures directed toward increasing the utilization of the additive, and hence also the degree of purification.

German Offenlegungsschrift No. 34 28 502 discloses a method for dry desulfurization of flue gases that contain flue ash, especially flue gases from a steam generator that is fired with brown coal or lignite. According to this method, additive in the form of limestone dust is supplied in the region of the firing, is separated off as flue dust after a certain retention time in the flue gas stream together with the accompanying flue ash, and subsequently, after being treated with dry steam, is returned to the already-cooled flue gas stream. During the steam treatment, the additive is reduced in size by a steam stream in the lower portion of a fluidized bed that is provided with two oppositely directed discharge nozzles, similar to a jet mill; this provides a new active surface at the core of the additive. At the same time, non-converted, free calcium oxide is hydrated by the steam. However, these measures are defined by the speed of the exothermic hydration, by the state or composition of the separated-off flue ash/additive mixture, as well as by the water/calcium oxide ratio. Thus, for example, the agglomeration of the additive particles increases when the water/calcium oxide ratio decreases. However, agglomeration counteracts the formation of new surfaces resulting from a reduction in size of the additive particles, as a result of which a desired improvement of the method is effectively limited to an increase of the retention time by return of the treated flue ash/additive mixture into the cooled flue gas stream. Furthermore, the use of dry steam which moreover is not supposed to condense pursuant to the known method, affects the energy balance of the method.

It is therefore an object of the present invention to still further improve the heretofore known method to achieve a greater retention time and utilization of the additive in the flue gas stream that is to be purified, and to achieve a greater degree of purification while avoiding the aforementioned problems.

BRIEF DESCRIPTION OF THE DRAWING

This object, and other objects and advantages of the present invention, will appear more clearly from the following specification in conjunction with the accompanying schematic drawing, which illustrates a preferred way of carrying out the inventive method.

SUMMARY OF THE INVENTION

The method of the present invention is characterized primarily by the steps of homogeneously mixing nonpulverized flue dust with finely sprayed water to effect hydration, and undertaking the return of flue dust to the flue gas purification process by returning at least a portion of dry, thus-hydrated flue dust to the firing equipment of the combustion unit.

The hydration with finely sprayed water is based upon the diffusion of water molecules through the surface shell into the interior of the nonpulverized flue dust particles. In conjunction with the return of the thus-treated dust into the region of the firing equipment of the combustion unit, on the one hand the formation of the active surface at the additive core required for binding the noxious gases essentially takes place only in the reaction chamber by splitting or breaking open of the particles as a result of temperature, and on the other hand the retention time of a portion of the additive used is nearly doubled. Thus, in an advantageous manner, not only can a higher degree of purification, especially a desulfurization rate of approximately 80%, be achieved, but the energy and additive requirement could also be reduced.

It is particularly advantageous to undertake the hydration with a greater than stoichiometric quantity of water. In so doing, the finely sprayed quantity of water should be introduced in conformity with the calcium oxide content of the flue dust.

In this connection, after hydration it can be expedient to remove excess water in the flue dust by a drying process. This avoids the considerable disruptions in operation caused by the moisture that is present in the mixture and that leads to sticking and an otherwise pasty condition of the flue dust already with a small excess of water or at a slight inhomogeneity.

Since hydration is an exothermic process, it can be particularly expedient to remove the excess water present in the flue dust after hydration by autothermic drying in order in this manner to obtain a freely flowing flue dust.

If a pulverous mixture is subjected to sifting or separation, granule fractions are obtained in which certain particles are enriched or are poor in certain components. For this reason, it can be expedient to obtain the partial stream that is to be returned by sifting prior to and/or subsequent to the hydration in order that the calcium oxide or calcium hydroxide be present in an enriched quantity in the respective partial stream. In this manner, the degree of utilization of the additive, or the degree of purification, can be increased further.

In addition, it is particularly advantageous to use calcium hydroxide or calcium carbonate as the basic, pulverous additive.

It has furthermore been shown to be particularly advantageous to mix the returned partial stream of flue dust with the fresh additive that is being supplied to the firing.

Further advantageous features of the present invention will be described in detail subsequently.

DESCRIPTION OF PREFERRED EMBODIMENTS

Referring now to the drawing in detail, above a grate firing 1 of a steam generator 2 finely divided or pulverized basic additive, preferably calcium hydroxide, is conveyed, separately from a fuel feed 3, out of a supply tank or hopper 5 of additive, via at least one feed point 4. The additive is introduced via air as a carrier stream, accompanied by optimum mixing and distribution, into a hot stream 6 of exhaust or flue gas that contains flue dust, sulfur compounds, and halogen compounds. The feed point 4 is disposed at a location of the grate firing 1 at which the stream of flue gas already has a temperature that prevents sintering of the reactive surface of the additive and encapsulation with the accompanying flue dust. The dust-containing flue gas is subsequently conveyed over heat transfer surfaces of the steam generator 2 for cooling the gas to approximately 750° C. within one to two seconds. After being cooled off, the flue gas stream 6 is conveyed to a dust-separator 7, such as a fabric filter, in which dust is separated from the flue gas. The nearly dust-free flue gas 8 is conveyed to the atmosphere via an induced draft blower or exhauster 9 and a chimney 10.

The flue dust/additive mixture 11 produced in the dust-separator 7 is conveyed to a first sifter or separator 12 from which a fraction 13 that is enriched with calcium oxide is drawn off and subjected to a water treatment. During this water treatment, the partial stream fraction 13 that is enriched with calcium oxide is moistened with a slightly greater than stoichiometric quantity of finely sprayed water 14 in a mixer 15. The flue dust/additive mixture 16 that is moistened in this fashion then passes into a reactor 17 in which a nearly complete hydration of the flue dust/additive mixture takes place. Since the hydration is an exothermic process, the excess water in the mixture 16 evaporates in the reactor 17. The steam that results therefrom escapes the reactor 17 via a vent pipe 18. The hydration is carried out in such a way that a dry and fluid or flowable flue dust/additive mixture 19 is withdrawn from the reactor 17 and is supplied to a further sifter or separator 20. The partial stream fraction 21 that is obtained from the separator 20, and in which the calcium hydroxide is enriched, is deposited in an intermediate container 22 from which at least a partial stream 23 of the treated flue dust/additive mixture is added to fresh additive from the supply hopper 5 in a mixing and feed mechanism 24 prior to entering the grate firing 1.

Depending upon the state or composition of the separated-off flue dust/additive mixture 11, or upon the way the hydration is carried out in the zone of the mixer 15 and the reactor 17, there is a possibility of dispensing with one or both of the separators 12 and 20.

A partial stream 25 of treated flue dust/additive mixture that is not returned to the direct desulfurization process is conveyed from the intermediate container 22 to a mixer 26, where the mixture is again treated with water 28 for further disposal at 27. In this connection, it is possible, in the mixer 26, to add to the flue dust/additive mixture 25 that is to be disposed of grating ash 29 that accumulates below the grate firing 1, a partial stream fraction 30 that is poor in calcium oxide and is obtained from the separator 12, and/or a partial stream fraction 31 that is poor in calcium hydroxide and is obtained from the separator 20.

It is also possible pursuant to the present invention to supply the partial stream of treated flue dust/additive mixture that is returned to the grate firing 1 via a separate feed mechanism, thus eliminating the common mixing and feed mechanism 24.

The present invention is, of course, in no way restricted to the specific disclosure of the specification and drawing, but also encompasses any modifications within the scope of the appended claims.

What we claim is:

1. In a method of purifying flue gas that comes from the firing equipment of a combustion unit, especially flue gas from firing equipment to which low-ash fuel is supplied, or from a grating firing having a high degree of ash removal, with said flue gas containing noxious compounds, including the step of using a pulverous basic additive on which said noxious compounds produced during firing are adsorbed, whereby flue dust, especially flue dust/additive mixture, that is carried along in said flue gas is separated from the latter, with at least a portion of the separated-off flue dust being hydrated and sifted, whereby subsequently at least a portion of the dry, hydrated flue dust is returned to the flue gas purification process, the improvement comprising the steps of:

homogeneously mixing non-pulverized, separated-off flue dust with finely sprayed water to effect said hydration; and undertaking said return of flue dust to the flue gas purification process by returning at least a portion of dry, thus-hydrated flue dust to said firing equipment of said combustion unit.

2. A method according to claim 1, which includes the step of sifting said portion of flue dust that is to be returned prior to said hydration step.

3. A method according to claim 1, which includes the step of sifting said portion of flue dust that is to be returned subsequent to said hydration step.

4. A method according to claim 1, which includes the step of sifting said portion of flue dust that is to be returned prior to and subsequent to said hydration step.

5. A method according to claim 1, which includes the step of providing, as said basic, pulverous additive, one of the group consisting of calcium hydroxide and calcium carbonate.

6. A method according to claim 1, which includes the step of mixing said returned portion of flue dust to fresh additive that is to be supplied to said firing equipment.

7. A method according to claim 1, which includes the step of undertaking said hydration with a greater than stoichiometric quantity of water.

8. A method according to claim 7, which includes the step, after said hydration, of drying said flue dust to remove excess water therefrom.

9. A method according to claim 8, which includes the step of effecting said drying via autothermic drying.

10. In a method of purifying flue gas that comes from the firing equipment of a combustion unit, especially flue gas from firing equipment to which low-ash fuel is supplied, or from a grating firing having a high degree of ash removal, with said flue gas containing noxious compounds, including the step of using a pulverous basic additive on which said noxious compounds produced during firing are adsorbed, whereby flue dust, especially flue dust/additive mixture, that is carried along in said flue gas is separated from the latter, with at least a portion of the separated-off flue dust being hydrated and sifted, whereby subsequently at least a portion of the dry, hydrated flue dust is returned to the flue gas purification process, the improvement comprising the steps of:

homogeneously mixing non-pulverized, separated-off flue dust with finely sprayed water to effect said hydration;

undertaking said return of flue dust to the flue gas purification process by returning at least a portion of dry, thus-hydrated flue dust to said firing equipment of said combination unit; and undertaking said hydration with a greater than stoichiometric quantity of water.

11. A method according to claim 10, which includes the step of sifting said portion of flue dust that is to be returned subsequent to said hydration step.

12. A method according to claim 10, which includes the step of sifting said portion of flue dust that is to be returned prior to and subsequent to said hydration step.

13. A method according to claim 10, which includes the step, after said hydration, of drying said flue dust to remove excess water therefrom.

14. A method according to claim 13, which includes the step of effecting said drying via autothermic drying.

* * * * *